Figure 8:
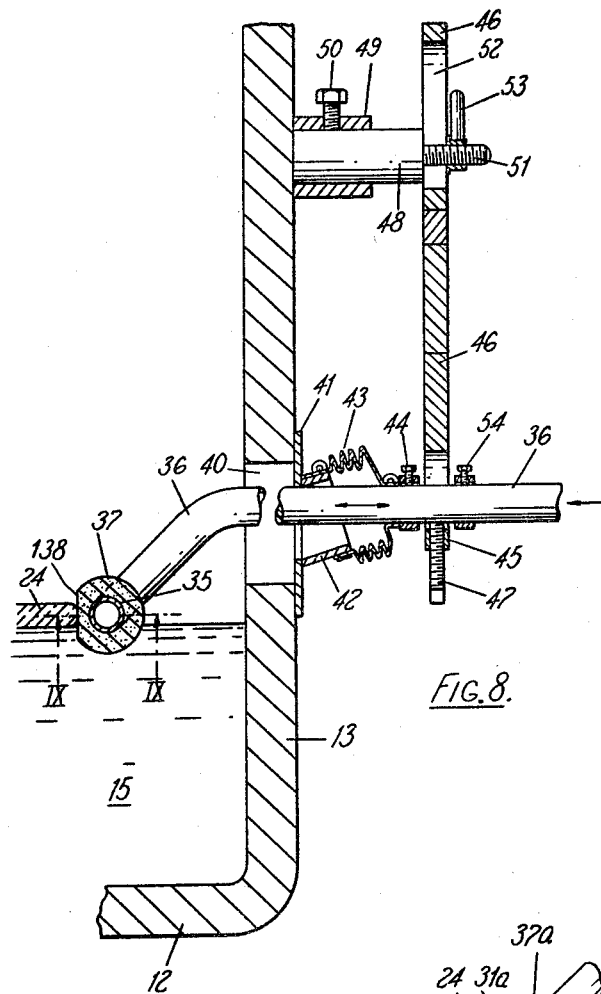

Aug. 16, 1966  L. A. B. PILKINGTON  3,266,880
MANUFACTURE OF FLAT GLASS
Filed March 26, 1962  6 Sheets-Sheet 1
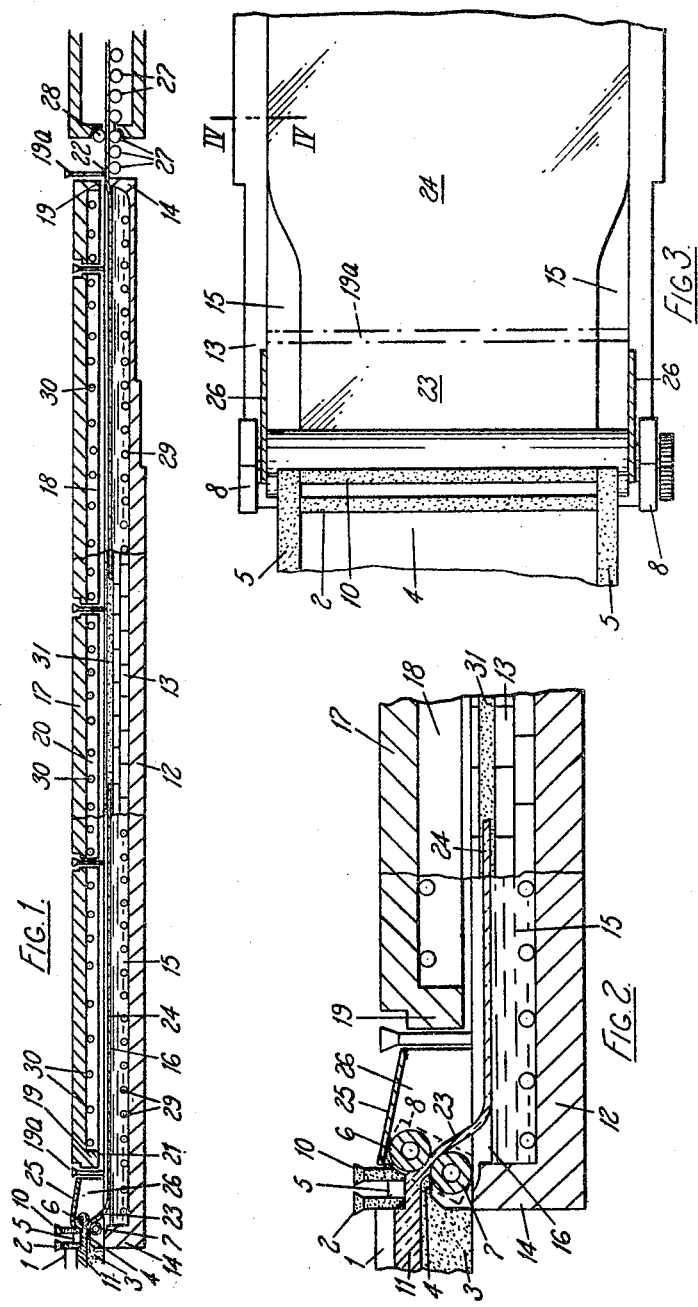

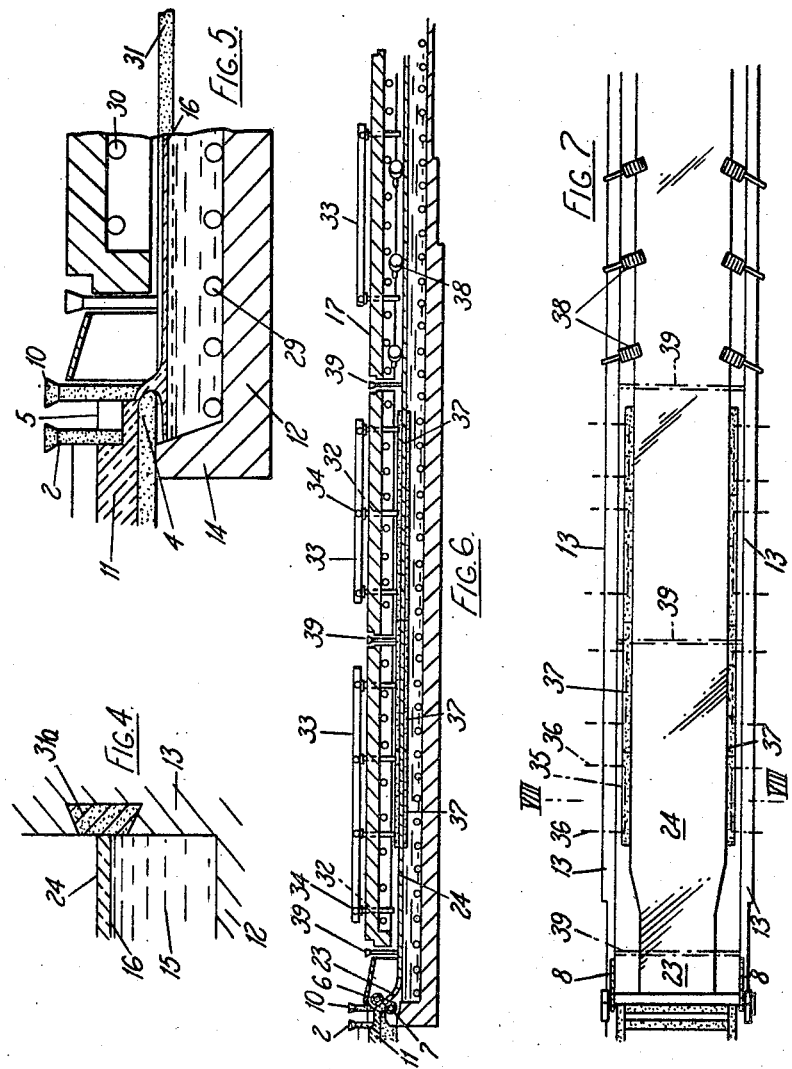

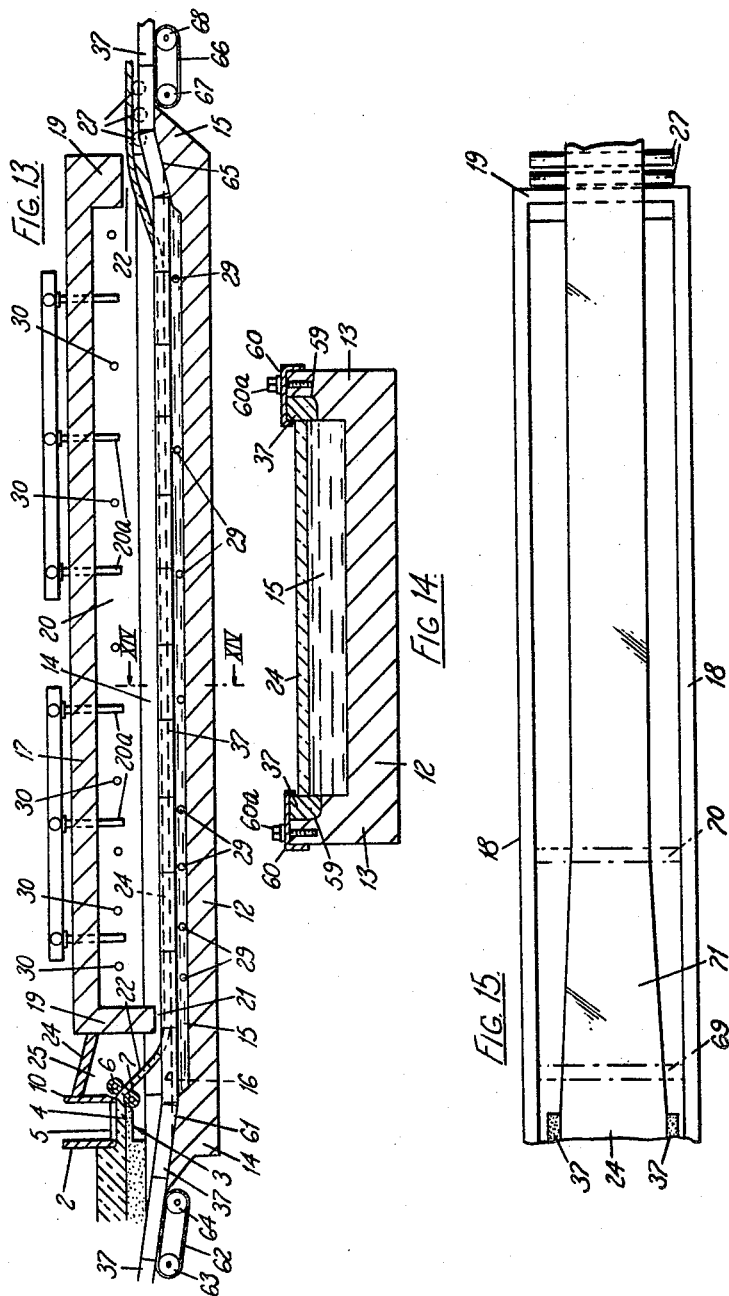

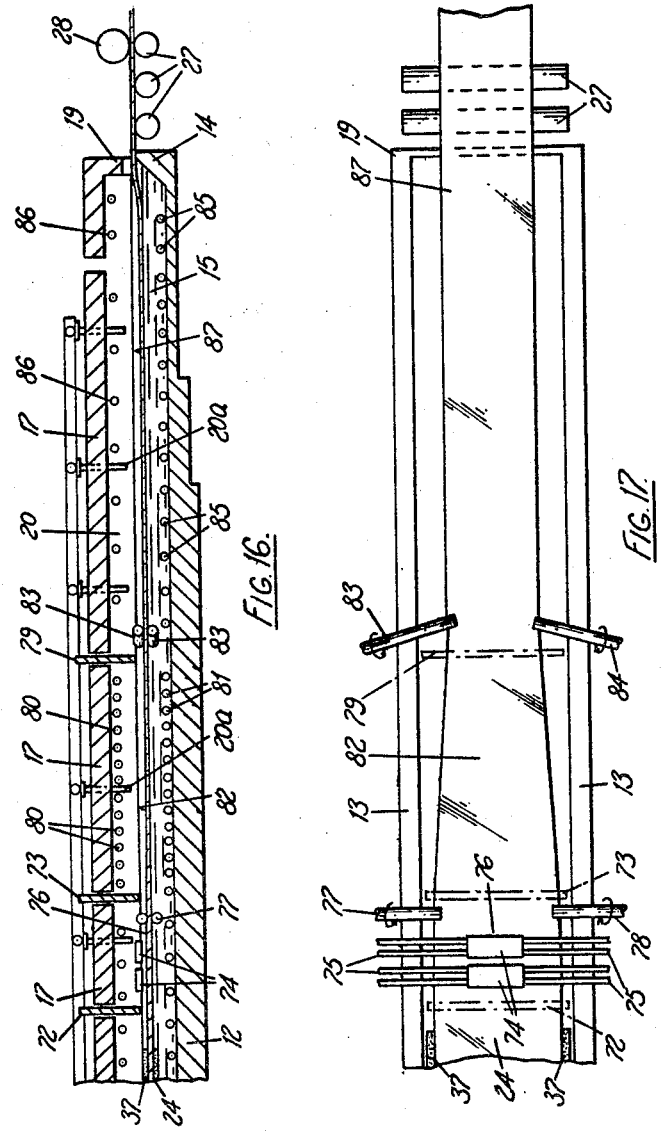

United States Patent Office 3,266,880
Patented August 16, 1966

3,266,880
MANUFACTURE OF FLAT GLASS
Lionel A. B. Pilkington, Rainhill, England, assignor to Pilkington Brothers Limited, Liverpool, England, a corporation of Great Britain
Filed Mar. 26, 1962, Ser. No. 182,479
Claims priority, application Great Britain, Mar. 29, 1961, 11,583/61
6 Claims. (Cl. 65—99)

This invention relates to the manufacture of flat glass.

In the manner of manufacture of flat glass in ribbon form by the usual rolling methods, imperfections of the roller surfaces are imparted to the surfaces of the glass as well as variations in thickness, sometimes referred to as "distortion" due to asymmetry in one or both of the rolls.

In the manufacture of flat glass in ribbon form by the usual vertical drawing methods, the glass produced has a lustrous finish but distortions occur in the drawn sheet as a result of temperature differences existing in the glass before the sheet has set. The process of vertically drawing flat glass is considerably slower than the process of producing flat glass by the usual rolling methods.

In the usual rolling methods the thickness of the glass produced is determined by the relative setting of the casting rolls, these rolls are accordingly sometimes referred to as "sizing rolls"; and in the usual method of vertically drawing flat glass the rate of production is entirely dependent on the viscosity of the glass about the line of draw in the body of molten glass from which the sheet is vertically drawn.

A main object of the present invention is to facilitate production of flat glass, at least at the rate at which drawn flat glass is produced in different thicknesses, and with at least the lustrous finish of vertically drawn flat glass, which drawn glass is usually referred to as "sheet glass" or "window glass."

A method of producing flat glass according to the present invention is characterized by establishing on a molten bath a buoyant layer of molten glass confined between non-wettable surfaces, advancing the buoyant layer between and in contact with the said surfaces and then cooling the layer sufficiently to enable it to be taken in ribbon form unharmed from the molten bath.

By presenting a non-wettable surface to the sides of the buoyant layer of molten glass it is possible to bodily advance the layer so that there is in substance a uniform velocity along the bath across the width of the layer.

In accordance with the invention the non-wettable surfaces may be advanced simultaneously with the buoyant layer along the bath, thereby eliminating any possibility of a drag on the moving layer at its lateral edges by reason of any friction existing between the non-wettable surfaces and the layer of glass.

Preferably in carrying out the present invention the molten bath is so consituted as to have all the characteristics as fully described in the United States of America Patent No. 2,911,759.

In accordance with the present invention the cooling of the layer on the bath of molten metal may be such as to convert the molten glass into a plastic state in which state the viscosity of the glass is such as to enable it to be advanced independently of the non-wettable surfaces and thereafter the layer is cooled to a stiffened state to enable it to be taken in ribbon form unharmed from the molten bath.

In such method a non-wettable surfaces may exist only for that length of the bath in which the glass in the layer tends to spread, but during the period of its advance after the layer has been cooled sufficiently to hold the dimensions imparted to it, the layer can be advanced in spaced relation with the walls of the bath of molten metal, and during its pasage along the bath in spaced relation with the walls it is cooled to enable the layer to be taken unharmed from the bath in ribbon form.

In the production of flat glass in ribbon form according to the invention as already described, the ribbon of glass taken from the molten bath has substantially the dimensions of the layer constituted between the non-wettable surfaces, but the invention comprehends modifying the thickness of the ribbon of glass as it is advanced.

The thickness of the glass is reduced to a desired thickness, but in carrying out such processes the width of the glass constituting the buoyant layer of molten glass may be retained in the ribbon of glass taken from the bath.

The present invention also comprises apparatus for manufacturing flat glass of desired thickness from a layer of molten glass, such apparatus comprising a tank structure, the tank of the structure holding a molten bath, means for supplying molten glass onto the molten bath, the tank side walls comprising at least at the surface level of the bath non-wettable surfaces against which the layer of glass moves in ribbon form as the glass is advanced along the bath, thermal regulators in said bath to progressively cool the glass until the glass can be taken unharmed from the bath, and conveying means to remove the ribbon of glass from the bath.

As hereinafter more particularly described the side walls of the tank, constructed according to the invention, may be composed of blocks formed of a non-wettable substance, for example of graphite or boron nitride, or formed with surfaces of such substances, but preferably such blocks are only employed at the surface level of the bath to support the molten layer as it passes along the bath, the other blocks being wholly composed of the usual refractories used in glass melting tanks.

Instead of confining the buoyant layer of molten glass between non-wettable surfaces incorporated in the structural blocks of the side walls of the tank, the buoyant layer of molten glass may be confined in a channel within the width dimension of the bath by two series of non-wettable tiles in abutting relation located in spaced relation with the normal side walls of the tank.

By spacing the channel, through which the molten layer of glass passes along the bath, from the side walls of the tank a more uniform temperature is obtained across the channel, hence the glass travelling along this channel is at a substantially uniform temperature and moves bodily along the tank at a uniform velocity at any cross-section of the layer between the non-wettable tiles.

The tiles may extend for the whole length of the bath or terminate where the glass has been stiffened sufficiently to retain its dimension.

Further the invention comprehends apparatus for manufacturing flat glass of desired thickness from a layer of molten glass comprising a tank structure, the tank of the structure holding a molten bath, means for delivering glass at a controlled rate to the bath and for advancing the glass along the bath as a layer of glass, the layer thus formed being confined on said bath by two series of mobile non-wettable tiles in abutting relation and the layer extending between the two series of tiles, actuating means for advancing the tiles simultaneously with the layer, said actuating means comprising ramps leading into and from the bath including guiding channels for guiding the tiles while entering and leaving the bath and horizontally arranged guides connecting said channels to guide the tiles engaging the layer as it is advanced and means for feeding tiles to the ramp leading to the bath.

In order that the invention may be more clearly understood, reference will now be made to the accompanying drawings which show, by way of example, preferred embodiments of the present invention.

Figure 10:
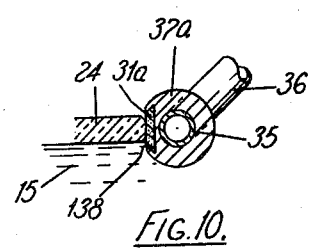
Figure 9:
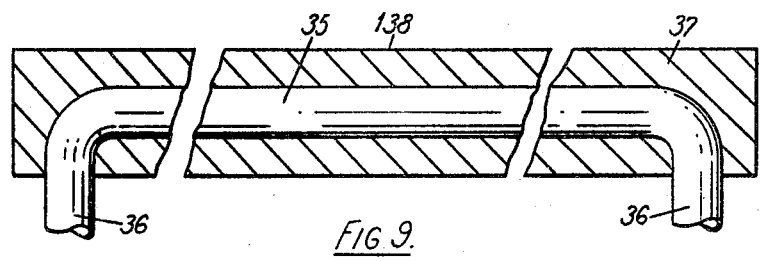
Figure 11:
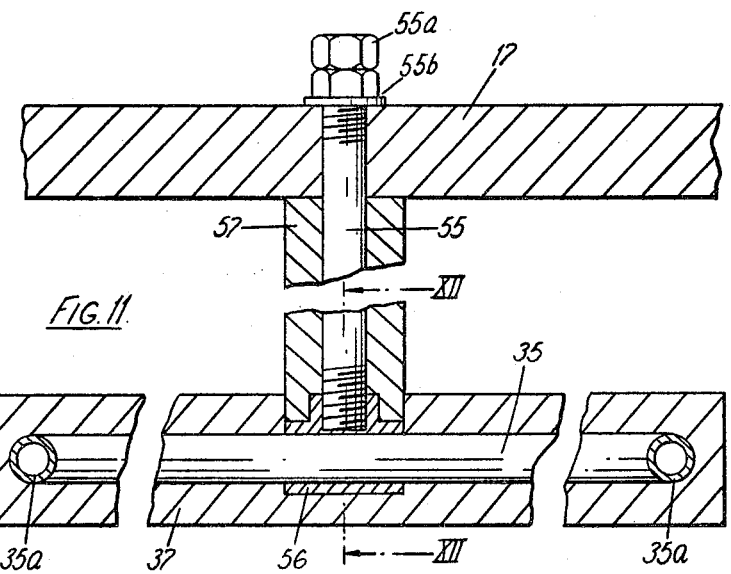
Figure 12:
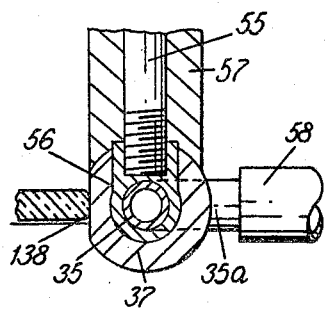

In the drawings:

FIGURE 1 is a central longitudinal sectional elevation of apparatus constructed according to the invention for use in the manufacture of flat glass in ribbon form on a molten bath, such apparatus comprising a tank structure including a non-wettable wall surface in which tank structure the bath of molten metal is confined, and a superimposed tank roof structure substantially enclosing the headspace over the bath, FIGURE 2 is a detailed view to a larger scale than that shown in FIGURE 1, more clearly showing the layer forming means of FIGURE 1 and the modified wall structure comprising a non-wettable surface located at the level of the bath, FIGURE 3 is a detailed plan view of the construction shown in FIGURE 2, FIGURE 4 is a transverse sectional elevation taken on line IV—IV of FIG. 3 showing one method of providing the side walls of the tank structure with a non-wettable surface at the surface level of the bath and of sufficient height to provide a non-wettable surface for the usual thicknesses of glass produced on the bath, FIGURE 5 is a view similar to FIGURE 2 showing an alternative method of feeding the glass to the tank to create the layer confined between the non-wettable surfaces of the tank structure, FIGURE 6 is a view similar to FIGURE 1 showing a tank in which the non-wettable surfaces, between which the layer of molten glass is confined on the bath, are in spaced relation with the side walls of the tank structure, FIGURE 7 is a corresponding plan view of the tank structure comprised in the apparatus shown in FIGURE 6, FIGURE 8 is a transverse sectional elevation on the lines VIII to VIII of FIGURE 7 to a much larger scale to more clearly show the construction of frames for supporting non-wettable surface elements, in the form of muffs, in spaced relation with the side walls of the tank structure and at the required level, FIGURE 9 is a part section through the part of the frame supporting the non-wettable muff, taken on line IX—IX of FIGURE 8, FIGURE 10 is a detail view similar to part of FIGURE 8, showing a refractory muff with an insert of non-wettable material moulded on the frame part, FIGURE 11 is an elevation, partly in section, showing means, depending from the roof structure, for supporting non-wettable surface elements at the required level, FIGURE 12 is a detail section on line XII—XII of FIGURE 11, FIGURE 13 is a sectional elevation of a further embodiment of the invention in which non-wettable surface elements are advanced down the bath, FIGURE 14 is a section on line XIV—XIV of FIGURE 13, FIGURE 15 is a plan view similar to FIGURE 7 and illustrating one way of reducing the thickness of the ribbon of glass produced between the non-wettable surface elements, FIGURE 16 is a central longitudinal sectional elevation of apparatus constructed similarly to that shown in FIG. 1 incorporating another method of reducing the thickness of the ribbon of glass produced in the apparatus between the non-wettable surface elements, and FIGURE 17 is a plan view of the tank structure comprised in the apparatus illustrated in FIGURE 16.

In the drawings like references designate the same or similar parts.

Referring now to the accompanying drawings, a forehearth of a continuous glass melting tank is indicated at 1, the regulating tweel at 2 and the spout at 3, the spout comprising a floor or "lip" 4 and side jambs 5, one only of which is shown, the side jambs and lip forming a spout of generally rectangular cross-section. In known manner, a cover may be secured over the spout.

Operatively associated with the spout are a pair of water-cooled casting rolls the upper of which is indicated at 6 and the lower at 7, mounted in side frames 8 one of which only is shown in FIGURE 2, the casting rolls being power driven in known manner. Alternatively the casting rolls may be driven in known manner at a relatively high speed, for example the linear speed of the surface of the rolls being of the order of 3,000" per minute, so that a clinging film of air is entrained on the surface of the roll, thus reducing heat transfer from the glass to the rolls.

Alternatively the casting rolls may be made of permeable material through which gas, delivered to the interior of the roll, percolates outwardly to form a gaseous layer between the glass and the rolls, as well understood in the art of manufacturing flat glass.

A gate 10 is adjustably suspended in known manner in a vertical plane in contiguity with the casting roll. The gate 10 shields the top roller 6 from the heat radiated by the molten glass 11 flowing from the forehearth over the lip 4 to pass between the rolls 6, 7.

The upper casting roll 6 is disposed in advance of the lower casting roll 7 so that the molten glass flows from the lip floor on to an upper part of the roll 7 presenting to the glass an outwardly and forwardly directed arcuate casting bed moving in the same sense as the direction of flow from the spout. Thus molten glass on leaving the spout and arriving on this casting bed is constrained to flow forwardly, thereby preventing backward flow of the molten glass leaving the spout 3.

The conventional ribbon forming means just described is disposed over the floor 12 of a tank structure including side walls 13 joined together by end walls 14 which hold a molten bath 15 having a specific gravity higher than that of the glass which is to be floated on the bath and the other characteristics as described in Patent No. 2,911,759. Molten tin has been found to be a suitable material for the formation of the bath presenting a substantially frictionless surface to the glass. The surface level of the bath is indicated at 16.

In FIGURE 1 structural blocks of the side wall 13 are shown shaded (at 31) to indicate the existence of non-wettable surfaces on the blocks as hereinafter fully explained.

The tank structure supports the roof structure including a roof 17, and side and end walls 18, 19 respectively, so that the roof structure encloses a headspace 20.

Outside the end walls 19 are vertically adjustable gates 19a which in co-operation with the walls of the tank structure, form restricted inlets and outlets 21, 22 for the glass to and from the bath. The molten glass passing to the casting rolls 6, 7 emerges in ribbon form, indicated at 23, and becomes a floating layer 24 buoyantly supported by the molten bath as hereinafter described.

Between the ribbon forming means 6, 7 and the adjustable gate 19a at the inlet end of the tank, an extension of the roof structure is provided, this extension forming a chamber enclosing the ribbon forming means, the chamber comprising a ceiling 25 and side walls 26 carried by the side walls 13 of the tank structure. Outside the discharge end of the tank mechanical conveying means for the glass are provided, exemplified by a horizontal series of driven rolls 27 disposed somewhat above the level of the bottom of the outlet 22 from the tank structure and superimposed driven rolls 28. The rollers 27, 28 cooperate to apply a tractive effort to the layer of glass moving towards the outlet 22. The tractive force so applied both removes the glass from the bath and assists in advancing the glass along the bath.

The ribbon leaving the bath is taken by the supporting rolls 27 into a conventional lehr, the inlet of which is defined by the pass between the cooperating rolls 27, 28.

The temperature of the bath is regulated from the inlet end to the discharge end by providing thermal regulators, indicated at 29, immersed in the bath, and the head-space 20 over the bath is preferably heated by radiant heat directed downwardly from the roof, and to this end heaters 30 may be mounted in the roof structure.

The thermal regulators 29, 30 at the entry end of the bath maintain a temperature of about 1,000° C., or slightly higher, over a sufficient length of the bath to ensure the maintenance of the buoyant layer of molten glass 24, the volume of glass supplied being such as to maintain the desired thickness of the layer of molten glass on the bath, the layer at all times extending across the bath to the side walls of the tank structure.

Instead of feeding a preformed ribbon of glass on to the molten bath and converting the glass into a molten layer on the bath, molten glass may be delivered at a rate determined by the thickness required for the layer of molten glass on the molten bath. Such a means of delivering the molten glass is shown in FIG. 5 where molten glass 11 flows direct from the spout 4 on to the surface of the molten bath to form the layer 24.

In the construction shown in FIGURE 1 the side walls of the tank structure which confine the layer on the bath present a non-wettable surface to the floating layer. To this end the refractory blocks, from which the side walls are made, are of a non-wettable material, that is to say non-wettable by the glass at the temperatures which the glass attains in passing along the bath. A suitable material for such blocks is graphite, but for means of economy the wall blocks of the tank structure at the level of the glass only as indicated at 31 are formed from graphite, or the blocks at the level of the bath are provided with a graphite surface along which the glass slides as it is advanced along the bath.

Again, for reasons of economy, the amount of graphite employed may be minimized by forming the wall blocks with an inset surface of graphite, as indicated in FIGURE 4 of the drawings. In FIGURE 4 the inset of graphite is indicated at 31a and interlocks with the wall block 32 by a dovetail joint.

Instead of forming the non-wettable surfaces of graphite these surfaces may be provided by tiles formed of graphite inset in the blocks provided that the headspace over the bath is charged with a non-oxidising gas and a plenum is maintained therein.

To protect the surface of the molten bath against oxidation, particularly at the entry and discharge end of the bath, that is under the glass being delivered to and taken from the bath, it is preferable to provide a non-oxidising gas in the headspace to prevent the formation at the surface of the bath of contaminants for the glass which otherwise would obtain due to chemical reaction at the surface of the bath. Moreover, in the event of the traction rolls 27, 28 being driven so as to attenuate the ribbon, the tractive effort directed longitudinally of the layer by the traction rolls may cause a narrowing of the ribbon and therefore an exposure of the bath surface to each side of the layer where narrowing occurs.

Accordingly in erecting apparatus for carrying out the present invention means may be provided for ensuring a plenum of a non-oxidising gas in the headspace to protect any exposed surface of the molten bath against oxidation, or any chemical reaction which would adversely affect the glass. The gas is required when the surface of the bath is exposed and this occurs when the layer is guided along a channel in the bath constituted between non-wettable faces, constructed in accordance with the invention, arranged in spaced relation with the side walls 13 of the tank structure.

Such a construction will now be described with particular reference to FIGURES 6, 7, 8 and 9 of the accompanying drawings.

Apparatus shown in FIGURES 6 and 7 for producing flat glass is structurally the same as that illustrated in FIGURES 1 and 2, and each preferably includes at intervals as shown in FIGURE 6 in the roof structure vertical ducts 32 connected to headers 33 by transversely arranged branches of the headers indicated at 34. Non-oxidising gas is supplied to the headspace through the ducts 32 and headers 33, 34.

In order to locate the non-wettable faces in spaced relation with the side walls of the tank structure the walls are furnished with tubular frames comprising straight parts 35 connecting parallel arms 36.

As most clearly shown in FIGURE 8 the arms are offset near the straight part 35 to facilitate the adjustment of the part 35 at the surface level of the bath.

The tubular construction is connected to a supply of cooling fluid, for example cold water so that the straight part 35 is sufficiently cooled. In accordance with this part of the invention a muff 37 of non-wettable refractory material, for example, graphite, is moulded around the straight part 35, as clearly shown in FIGURES 6 to 9. As shown in FIGURE 8 the moulded muff 37 is of a substantially annular section but is formed with a flat face 138 which is the non-wettable surface engaged by the glass 24 on the bath.

Each of the moulded muffs extends beyond the ends of the straight part 35 so that the flat ends of the muffs are maintained in abutting relation as shown in FIGURES 6 and 7. Alternatively the ends of the muffs 37 may be shaped as scarf joints with offset flat surfaces which abut against each other. The abutting muffs 37 at each side of the tank are in spaced relation with the side walls 13 of the tank, thus defining a channel along the bath in spaced relation with the side walls 13 for use in creating on the bath a molten layer of glass 24 from the glass delivered in ribbon form, indicated at 23, by the casting rolls 6 and 7, the layer of glass 24 being supported between the two linear series of muffs 37 as clearly shown in FIGURE 7.

As shown in FIGURES 6 and 7 edge rolls 38 may be employed to engage the edges of the layer where the glass has been cooled to a transitional state after it has left the confines of the spaced series of muffs 37 so as to apply transverse tensile forces to maintain the width of the layer if the tractive effort from the rolls 27, 28 is increased to reduce the thickness of the layer from that existing between the linear series of muffs 37. The aforesaid transitional state occurs where the glass is at a temperature of from 850° to 700° C.

The headspace in the tank may be sub-divided by vertically adjustable tweels, indicated at 39, to assist in regulating the temperature within the apparatus.

In order to prevent the atmosphere in the headspace escaping where the arms 36 pass through the structure walls, the wall structure is provided with apertures 40 for the arms of the tubular frames 35, 36, each of which apertures is covered by a plate 41 mounted on the wall structure, each plate being provided with an offset socket 42 through which an arm 36 passes, the socket being provided at its outer end with a gas seal formed by a flexible container 43, conveniently of concertina form, and which is clamped on to the respective arm 36, as generally indicated at 44.

The arm 36 is carried in an eye 45 of a vertically adjustable link 46 and is clamped in the eye of the arm by a set-screw 47. The link 46 is mounted against a stub 48 carried in a socket 49 mounted on the tank structure and secured in the socket by a stud 50. The stub 48 is provided with a threaded element 51 which passes through a slot 52 in the upper part of the link 46, and a clamp 53 is mounted on the threaded element 51 and secures the link against the stub 48 in each position of adjustment.

Thus it will be observed that each frame 35, 36 is set with the muffs at the desired level by adjusting a pair of vertical links 46, each holding one of the two arms 36 of the water cooled frame carrying the muff 37.

The inward setting of each arm 36 of the frames carrying the muffs may be secured by the set-screw 47, but a collar 54 may be set on the arm to cooperate with the respective clamp 44 to hold the arm in its position of axial adjustment.

The non-wettable surfaces 138 of the muffs 37 are thus adjustable for both lateral and vertical displacement.

An alternative construction of the muffs is illustrated in FIGURE 10, which shows a muff 37a of refractory material moulded on the straight part 35 of the tubular frame. The non-wettable surface of the muff is the flat front face 138 of a non-wettable tile 31a which tile is inserted in the refractory muff 37a. The flat faces 138 of the inserts in all the muffs abut to form the longitudinally extending non-wettable surfaces defining the channel through which the layer of glass 24 is steered.

In another construction illustrated in FIGURES 11 and 12 the muffs 37 may be moulded around the tubular straight parts 35 of the frame which in this construction terminate in short tubular arms 35a, and the muffs, for example graphite muffs are suspended from the roof structure 17 in abutting relation to form said non-wettable surfaces spaced from each side wall 13 of the tank and defining a medial channel down the bath.

Means for suspending a muff 37 from the roof 17 is illustrated in FIGURES 11 and 12 in which the straight part 35 is connected to a supporting rod 55 by a T-junction piece 56. The rod 55 may be surrounded by refractory material 57 and the top end of the rod 55 is threaded and is secured in the roof structure 17 by nuts 55a bearing against a washer 55b on top of the roof 17, the length of the rod being such that when the nuts 55a are tightened the top of the refractory 57 bears against the underside of the roof 17, and the muff 37 positioned at the required level in the bath and abutting adjacent muffs in the series down each side of the tank.

The short arms 35a which extend through the back of the moulded graphite muff 37, as indicated in FIGURE 12, may be connected to a cold water supply through the side walls of the structure by flexible connections 58 which permit the adjustment of the muffs to their correct setting in the bath. The flat surfaces 138 on each of the muffs is in such a position when the muff is correctly adjusted that it co-operates with the flat surfaces 138 on the other muffs to form a continuous non-wettable surface extending down the bath.

The muffs suspended from the roof structure may also be formed of refractory material with inserts constituted in inset tiles 31a of non-wettable material as illustrated in FIGURE 10.

Instead of being formed by a series of abutting non-wettable surface elements extending down each side of the bath, the non-wettable surfaces may be formed by a continuous strip of non-wettable material fixed in the side walls of the tank at the surface level of the molten metal or supported in spaced relation to the tank side walls to define the channel for the layer of glass.

By utilising the constructions hereinbefore described, with particular reference to FIGURES 6 to 12, the layer of glass is steered in a medial channel on the bath 15. The layer 24 of the glass has a substantially uniform viscosity across the width of the layer so that a substantially uniform velocity across the layer is obtained and moreover distortion of the glass, due to lack of uniformity of velocity across the bath, is entirely eliminated.

Even though the muffs 37 or the muff insets 31a are not wetted by molten glass, the muffs or inserts being made for example of graphite, so that the edge of the layer of glass slides over the muffs 37, there may be some frictional resistance to the edges of the glass advancing along the bath in contact with the flat faces 38. This frictional resistance, which is slight, may nevertheless result in some drag on the edges of the layer of glass.

In order to avoid this effect the non-wettable surface elements employed are mobile tiles 37 which are advanced down the bath simultaneously with the layer of glass.

Referring to FIGURES 13 and 14 the mobile non-wettable tiles 37 have in the illustrated embodiment a partly curved cross-section and are held in longitudinally extending grooves 59 extending along the side walls 13 of the tank at the surface level of the bath. The height of the mobile tiles 37 is such that the bottom of each tile is immersed in the bath 15 and the top rises above the level of the layer of molten glass 24. The mobile tiles 37 are pressed into the grooves 59 by the pressure of the layer of molten glass 24 and are held in position by guide covers 60 fixed into side walls 13 of the tank by bolts 60a. The mobile tiles 37 abut each other and may be joined, for example, by scarf joints. As an alternative the mobile tiles 37 may be of refractory material which would be wettable by the glass, but having an insert 31a of non-wettable material at the level of the glass as indicated in FIGURE 4.

The mobile tiles 37 are fed into the grooves 59 down downwardly sloping ramps 61 at each side of the tank. The ramps 61 have associated side walls which form channels therewith, and the channels terminate beneath the surface 16 of the bath so that the tiles are floated into the grooves 59.

Tile feeding means, e.g., a belt 62, extending between two pulleys 63 and 64, is associated with each ramp and tiles 37 are placed at the inlet end of the belt 62 in abutting relation and are driven forward by the belt at a constant velocity. Because the mobile tiles abut each other the belt pushes the linear series of tiles down the groove 59 and this velocity is regulated by regulating the drive to the pulleys 63 and 64 so that a substantially uniform velocity is maintained across the whole width, i.e., from edge to edge of the layer 24 of molten glass as it is advanced down the bath of molten metal.

The drives for feeding both series of mobile tiles are synchronised so that the tiles at each side of the tank are advanced simultaneously down the bath at the same velocity at both sides of the tank. As the non-wettable surfaces of the tiles 37, against which the edges of the layer of glass 24 abut, are moving at the same velocity down the bath as the layer there is no sliding of the glass over the non-wettable surfaces and thus no frictional forces act on the edges of the layer of molten glass as it is advanced.

At the outlet end of the tank the stabilised and cooled ribbon of glass is taken through the outlet 22 by rollers 27 and 28 and the tiles 37 are taken out of the bath through separate channels 65 on to a belt 66 extending between pulleys 67 and 68. The tiles 37 are returned to the input end of the tank for re-use.

The ribbon of glass produced from the molten layer 24 has a predetermined thickness which is determined by the width of the channel defined on the bath between the non-wettable elements in whichever form they be, the rate of delivery of the glass to the bath, and the rate at which the cooled ribbon of glass is taken from the outlet end of the bath by the rollers 27 and 28.

The thickness of the glass may, however, be reduced, while maintaining the properties of the layer produced between the non-wettable surfaces, by imposing a longitudinally directed tractive force on the layer of glass 24 while it is in a transitional plastic state in which plastic state the glass is capable of being subjected to controlled attenuation.

One method of reducing the thickness of the layer of glass is illustrated in FIGURE 15. Partitions 69 and 70 extend across the bath and downwardly from the roof 17 to define a zone in which the layer is cooled to a transitional plastic state. The glass in this transitional plastic state is indicated at 71 and in this state its dimensions are not controlled by forces of surface tension and gravity. The temperature of the glass in the region of the first partition 69 is about 850° C. and the temperature in the second partition 70 is about 700° C. when treating soda lime glass, so that the ribbon of glass emerging from under the second partition 70 is sufficiently stiff to hold its form, that is its dimensions are stabilised.

The tractive effort applied to the cooled ribbon of glass emerging from the bath by the rollers 27 and 28 is sufficient to maintain the ribbon moving along the bath and also to impose a longitudinally directed tractive force on the plastic glass 71. This tractive force is dissipated in the plastic glass 71, although the molten glass in the layer 24 may be accelerated as it flows under the partition 69, giving controlled attenuation of the plastic glass 71 and thereby causing a progressive decrease in its width and thickness to a predetermined extent exemplified by the tapering form of the plastic glass 71 shown in FIGURE 15.

The dimensions of the attenuated ribbon of glass are stabilised by the further cooling which is effected as the glass advances from under the partition 70 and when the glass is in the stabilised condition it cannot be further attenuated by the tractive force applied from the rollers 27 and 28 so that the ribbon of glass taken from the bath has a predetermined thickness which is less than the thickness of the layer formed between the non-wettable surface elements 37, but has the pristine flatness and freedom from distortion of the ribbon of glass produced between the elements 37.

In order to produce even thinner glass an even greater longitudinally directed tractive force is applied to the layer of glass 24, by the apparatus illustrated in FIGURES 16 and 17 in which the molten layer of glass 24 is cooled as it leaves the non-wettable surface elements 37, the cooling being continued until the glass is sufficiently stiff to be capable of being gripped. As illustrated in FIGURES 16 and 17 the tank downstream of the non-wettable surfaces is divided into zones by partitions extending across the tank structure and downwardly from the roof. After leaving the non-wettable surface elements 37 the layer of glass 24 passes under a partition 72 which with a second partition 73 defines a zone enclosed in a chamber. Water cooled boxes 74 are mounted between the side walls 13 of the tank structure and over the path of the glass leaving the elements 37. Each of the water cooled boxes 74 is of a rectangular section and has a flat lower surface which absorbs heat radiated from the glass as it is advanced under the boxes so that the ribbon is cooled as it is advanced under the boxes 74 to stiffen it sufficiently to be capable of being gripped.

Water is supplied to and exhausted from the boxes 74 by pipes 75 which also support the boxes 74 on the side walls 13 over the glass.

The cooled stiffened ribbon of glass 76 which emerges from under the boxes 74, is gripped by two pairs of edge rolls 77 and 78 respectively mounted at oppositely disposed locations across the tank. The lower roll of each pair is immersed in the bath 15 and the upper roll of each pair is arranged above the surface of the bath so that the edges of the stiffened ribbon 76 are gripped between the rolls as indicated in FIGURE 15. The axes of the rolls 77 and 78 are perpendicular to the direction of travel of the ribbon. Driving means connected to the rolls 77 and 78 is operable to control their rotational speeds the rollers rotating in the direction of the arrows shown on the upper rolls in FIGURE 16, thereby to effect a control of the velocity of the stiffened ribbon 76 along the bath.

The glass as it passes under the boxes 74 is stiffened over the whole width of the glass so that the stiffened ribbon 76 which is gripped by the edge rolls 77 and 78 constitutes a barrier to resist the transmission of longitudinal acceleration forces to the layer of molten glass 24 between the non-wettable surfaces.

The speed at which the rolls 77 and 78 are driven may be such that the velocity of the stiffened ribbon 76 along the bath is the same as the velocity of advance of the layer of glass 24. Alternatively the speed of rotation of the rolls 77 and 78 may be such that the velocity of the stiffened ribbon 76 along the bath is slightly greater than the velocity of advance of the molten layer 24 so that there will be a slight tapering of the layer as it approaches the partition 72.

The stiffened ribbon 76 passes under the partition 73 into a second zone enclosed in a chamber defined between the partition 73 and a third partition 79 extending across the tank and downwardly from the roof. In the head space of this second zone there is a concentration of heaters 80 and a corresponding concentration of heaters 81 is immersed in the molten bath 15 between the partitions 73 and 79.

The stiffened ribbon 76 is at a temperature of about 700° C. when it passes under the partition 73 and the temperature gradient between the partitions 73 and 79 is such that the temperature of the ribbon is raised during its passage through this zone to about 850° C., when treating soda lime glass. Thus, as the glass passes through this zone it is progressively reheated to a transitional plastic state although it is not made so hot that forces of surface tension and gravity play any substantial part in determining the dimensions of the ribbon in a plastic state indicated at 82.

The plastic glass 82 is subjected to controlled attenuation in the manner described above with reference to FIGURE 15, the longitudinally directed tractive force imposed on the plastic glass 82 by the lehr rollers 27 and 28 being sufficient to maintain the ribbon of glass moving along the bath surface and also to apply the tractive force required to accelerate the plastic glass to cause the desired reduction in its thickness. The tractive force is partly dissipated in the attenuation of the plastic glass 82, and the stiffened ribbon 76 and gripping rolls 77 and 78 form a barrier which resists the transmission of any longitudinally directed tractive forces to the layer of glass 24 between the non-wettable surfaces.

The width of the ribbon of glass emerging from under the partition 79 is controlled by the application of tensile forces developed transversely of the ribbon in the plastic state by two pairs of auxiliary edge rolls 83 and 84 which are respectively mounted at oppositely disposed locations just downstream of the partition 79 and which grip the edges of the plastic ribbon emerging under the partition 79 to control and maintain the width of the plastic ribbon as its thickness is further decreased.

The axes of the edge rolls 83 and 84 are inclined to the direction of travel of the ribbon and the rolls rotate in the direction of the arrows indicated in FIGURE 17. Thermal regulators 85 immersed in the bath 15 and thermal regulators 86 in the head space over the bath between the partition 79 and the end wall 19 regulate the temperature in this zone by creating a temperature gradient down to 650° C. at the outlet 22 so that the dimensions imposed on the ribbon leaving the edge rolls 83 and 84 are stabilised, and the stabilised ribbon is then sufficiently cooled to permit it to be taken unharmed from the bath by the lehr rollers 27 and 28.

The edge rolls 83 and 84 may be free-running or may be driven in a direction to assist in the advancing of the ribbon, for example, they may be driven at a higher speed than the rolls 77 and 78 in order to assist the attenuation of the plastic glass.

It will be understood that the auxiliary edge rolls 83 and 84 can be supplemented by ancillary pairs of edge rolls acting on the glass in the plastic state so that there are successive pairs of edge rolls between the rolls 83 and 84 and the outlet end of the tank operating on the glass before the dimensions become stabilized, which edge rolls may be driven at progressively increasing velocities to accelerate the ribbon glass as it is advanced.

The layer 24 of molten glass has uniform thickness and flat parallel surfaces and the pristine flatness of this layer is maintained in the stiffened ribbon 76 and in the plastic glass 82 as it is attenuated so that the ribbon 87 discharged from the tank is of uniform predetermined thickness, is free from distortion and has flat parallel surfaces and a fire finish lustre.

It will be appreciated from the foregoing description that as the linear velocity of the glass in the layer is substantially identical across the width of the layer at any point of its length and that disturbance of the glass at the edges of the layer is substantially eliminated, that wastage is substantially eliminated. Moreover, the bottom edges at each side of the layer are rounded thereby facilitating manipulation of the product.

The present invention also comprises, as a new article of manufacture, the glass produced in continuous ribbon form on a bath of molten metal between nonwettable surfaces, and articles worked up from such glass.

I claim:

1. A method of producing flat glass in ribbon form, comprising establishing a buoyant layer of molten glass on a bath of molten metal while confining said layer between non-wettable surfaces extending along said bath and in non-wetting contact with the edges of the glass, advancing the buoyant layer along the bath while maintaining said non-wettable confining edge contact with said surfaces, and then cooling the layer sufficiently to enable it to be taken in ribbon form unharmed from the bath of molten metal.

2. A method of producing flat glass in ribbon form as described in claim 1, wherein said non-wettable surfaces are of graphite.

3. A method of producing flat glass in ribbon form, comprising establishing a buoyant layer of molten glass on a bath of molten metal while confining said layer between non-wettable surfaces extending along said bath and in non-wetting contact with the edges of the glass, advancing the buoyant layer along the bath while maintaining said non-wettable confining edge contact with said surfaces and under conditions to ensure the maintenance of uniform velocity across the whole width of the layer, and then cooling the layer sufficiently to enable it to be taken in ribbon form unharmed from the bath.

4. Apparatus for manufacturing flat glass from a layer of molten glass comprising a tank structure including a tank containing a bath of molten metal, and a pair of spaced side walls extending along said bath and presenting at least at the surface level of the bath inner facing surfaces of composition not wettable by molten glass, means for supplying glass to said bath between said non-wetting surfaces at a rate and under conditions to form a layer of molten glass between said non-wetting surfaces reaching to said non-wetting surfaces and coming in edge contact with said non-wetting surfaces as to be laterally confined thereby, means for advancing the layer of molten glass along said bath while maintaining said non-wetting edge contact with the glass, and thermal regulators in said bath along its length to progressively cool the layer until the glass can be taken unharmed in ribbon form from the bath.

5. Apparatus for manufacturing flat glass as described in claim 4, wherein the composition of said non-wettable surface is graphite.

6. Apparatus for manufacturing flat glass of desired thickness from a layer of molten glass comprising a tank structure including a tank having side walls and holding a bath of molten metal, and two series of non-wettable surface elements, the elements of each series being located in abutting relation on supports carried by the tank structure in spaced relation with the respective tank side wall to define a channel on the bath within the lateral dimensions of the bath, means for supplying molten glass to one end of the channel and for advancing the molten glass as a layer between the two series of non-wettable surface elements, said non-wettable surface elements being located by the supports at least at the surface level of the bath and in position to confine the layer of glass on the bath by edge contact of the layer therewith, thermal regulators in said bath to progressively cool the layer between the two series of non-wettable surface elements to a stiffened state, means for applying a tractive effort to the stiffened glass in a longitudinal direction to assist in advancing the glass from the non-wettable surface elements to the discharge end of the tank, and means for conveying the glass out of the bath.

References Cited by the Examiner

UNITED STATES PATENTS

| | | | |
|---|---|---|---|
| 710,357 | 9/1902 | Heal | 65—258 |
| 1,469,383 | 10/1923 | Crowley | 65—90 |
| 1,489,852 | 4/1924 | Rowley | 65—91 |
| 1,548,435 | 8/1925 | Bock | 65—176 |
| 1,759,225 | 5/1930 | Drake | 65—199 |
| 2,618,012 | 11/1952 | Milne | 65—200 X |
| 2,668,988 | 2/1954 | Bailey et al. | 18—48 |
| 3,134,660 | 5/1964 | Long | 65—374 |

DONALL H. SYLVESTER, *Primary Examiner.*

D. CRUPAIN, *Assistant Examiner.*